Aug. 8, 1933.　　　　　C. G. SUITS　　　　1,921,789

PULSATION APPARATUS

Filed July 1, 1932

Inventor:
Chauncey G. Suits,
by Charles V. Tullar
His Attorney.

Patented Aug. 8, 1933

1,921,789

UNITED STATES PATENT OFFICE 1,921,789

PULSATION APPARATUS

Chauncey G. Suits, Schenectady, N. Y., assignor to General Electric Company, a Corporation of New York Application July 1, 1932. Serial No. 620,426

2 Claims. (Cl. 171—97)

My invention relates to electrical apparatus for producing pulsations in an alternating current particularly pulsations of a relatively low frequency, my present invention being an improvement over my prior invention which is disclosed and claimed in my copending application, Serial No. 510,750, filed Jan. 23, 1931, for pulsation apparatus, both applications being assigned to the same assignee. The improvement covered by my present application has for its object the provision of alternating current pulsation apparatus which is characterized by greater flexibility and which may be manufactured at a lower cost than that of my aforesaid invention.

My invention will be better understood from the following description taken in connection with the accompanying drawing, and its scope will be pointed out in the appended claims.

Figure 1:
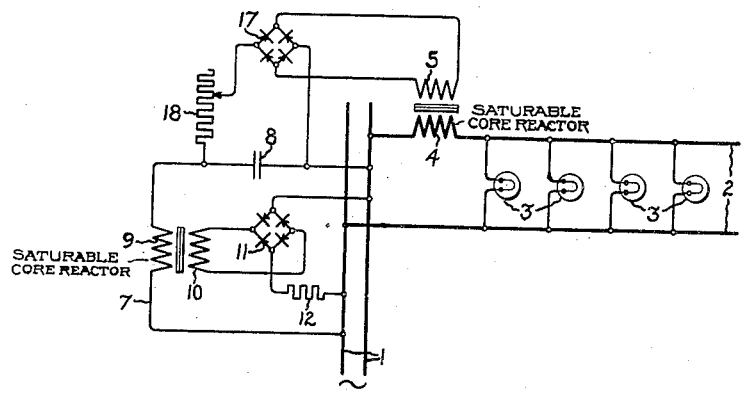
Figure 2:
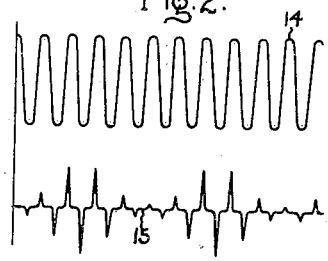
Figure 3:
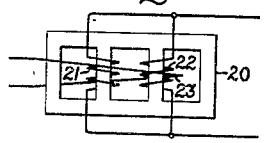
Figure 4:
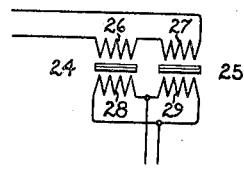

Referring to the drawing, Fig. 1 is a circuit diagram illustrating one embodiment of my invention; Fig. 2 shows the voltage wave form of the supply circuit and the corresponding wave form of the current in the pulsation control circuit; Fig. 3 shows diagrammatically one form of saturable core reactor forming a part of my invention; and Fig. 4 an alternative form of saturable core reactor.

In Fig. 1, I have shown a source of supply 1 of constant potential alternating current which, for example, may be a 60 cycle, 110 volt lighting circuit, and connected to this source of supply is the load circuit 2 which in the present case is represented as a lighting circuit containing lamps 3. Connected in series in the load circuit 2 is the saturable core reactor 4 whose function is to vary the mean effective value of the current supplied to the lamp load. Since reactor 4 is arranged in series in the load circuit any variation in the impedance offered thereby will vary the voltage applied to the lamps connected across the circuit. The saturable core reactor 4 is provided with the direct current saturating winding 5 whereby the degree of saturation of the reactor core and hence the reactance offered by the reactor may be varied. I shall now describe the means by which the current in the saturating winding 5 of reactor 4 is caused to alternately increase and decrease thereby to cause a corresponding increase and decrease in the impedance offered by the reactor 4 to the load circuit.

Connected across the alternating current supply 1 is the alternating pulsation circuit 7 which comprises the capacitor 8 and the saturable core reactor 9 having the saturating winding 10. This winding 10 may be supplied with direct current from any suitable source whereby the core of the reactor when in operation may become saturated. A convenient manner of supplying direct current to the winding 10 is through the full wave rectifier 11 connected with the alternating current source 1, a suitable limiting resistance 12 being shown in the connection.

Referring now to the curves shown in Fig. 2, the sine curve 14 may represent the voltage wave of the supply circuit 1, while curve 15 represents the corresponding current flowing in the pulsation circuit 7. It will be seen from an inspection of curve 15 that the effective value of the alternating current in the pulsation circuit 7 alternately increases and decreases in a regularly recurring manner. The operation of the pulsation circuit is due to the fact that it becomes resonant at a low current value and when a condition of resonance exists in the circuit the resulting increase of current in the reactor 9 causes the impedance of the reactor to rise in a manner characteristic of biased core reactors to such a degree that the circuit is detuned from its resonant condition. The current then drops to the former low value only to rise again when resonance is thus reestablished. This sequence repeats itself regularly and indefinitely. With simple apparatus of the nature described above and supplied by 60 cycle current, I have obtained pulsation frequencies ranging from ten per second to one in many seconds. The saturating winding 5 is supplied with direct current by connecting it through the full wave rectifier 17 with the opposite sides of the capacitor 8 through a suitable rheostat 18. As so connected the current in the saturating winding 5 of reactor 4 alternately increases and decreases in accordance with the changes in the effective value of the current in the pulsation circuit 7.

The operation of the apparatus will be readily apparent from the above description. The alternating current in the pulsation circuit 7 being of the variable character shown by curve 15 of Fig. 2 whereby the effective value alternately increases and decreases in a regular manner causes a corresponding variation in the rectified saturating current of reactor 4. Hence the impedance offered by reactor 4 will vary in a corresponding manner causing the illumination of lamps 3 forming the load circuit to alternately increase and decrease in a corresponding regular manner.

In my aforesaid prior invention the load is included directly in the pulsation circuit. In my present invention the load circuit is separate from but controlled by the pulsation circuit. This arrangement has the advantage over my earlier invention in that the pulsation frequency is independent of the load. Also it is practical to use the same reactor 4 when either one or a number of lamps are employed in the load circuit. While it is not possible to realize the full line voltage across the load when employing a control reactor, as in the present invention, I have found that it is practical to obtain from 85% to 97% of the line voltage at the lamp load.

For the sake of simplicity in Fig. 1 of the drawing, I have shown the saturable core reactors 4 and 9 in a purely diagrammatic manner. Their actual construction may, for example, be as shown in Fig. 3, where the core 20 has four legs, the main winding of the reactor comprising coils 21 and 22 wound in opposite directions on the two inner legs of the core and connected in parallel with the alternating current circuit and the saturating winding comprising the single coil 23 which surrounds both legs. A reactor of this type is disclosed in the Alexanderson Patent No. 1,328,610, filed Jan. 20, 1920. Instead of a single core reactor I may employ two separate transformers 24 and 25 as shown diagrammatically in Fig. 4. These transformers respectively have saturating windings 26 and 27 which are shown connected in series and have alternating current windings 28 and 29 shown connected in parallel. The two latter windings preferably are reversed in order to prevent alternating current from being induced in the direct current circuit.

I have chosen the particular embodiment described above as illustrative of my invention and it will be apparent that various other modifications may be made without departing from the spirit and scope of my invention, which modifications I aim to cover by the appended claims.

What I claim as new and desire to secure by Letters Patent of the United States, is,—

1. In combination, a constant potential source of alternating current supply, a load circuit connected therewith, a saturable core reactor arranged in series in the load circuit and having a saturating winding, an alternating current pulsation circuit supplied from said source and including a capacitor and a saturable core reactor, and means including a rectifier connecting said saturating winding across said capacitor.

2. In combination, a constant potential source of alternating current supply, a load circuit connected therewith, a saturable core reactor arranged in series in the load circuit and having a saturating winding, an alternating current pulsation circuit supplied from said source and including a capacitor and a saturable core reactor, a rectifier having its input circuit connected across said capacitor and its output circuit connected to supply said saturating winding and a rheostat in said input circuit.

CHAUNCEY G. SUITS.